United States Patent [19]

Shibata

[11] Patent Number: 5,700,049
[45] Date of Patent: Dec. 23, 1997

[54] BODY STOPPER STRUCTURE OF A CAR

[75] Inventor: Akinao Shibata, Fujisawa, Japan

[73] Assignee: Isuzu Motors Limited, Tokyo, Japan

[21] Appl. No.: 699,356

[22] Filed: Aug. 19, 1996

[30] Foreign Application Priority Data

Aug. 29, 1995 [JP] Japan ............... H7-219917

[51] Int. Cl.$^6$ ............... B62D 25/20; B62D 23/00
[52] U.S. Cl. ............... 296/188; 296/209; 296/203
[58] Field of Search ............... 296/188, 189, 296/193, 194, 203, 204, 209, 29, 30

[56] References Cited

U.S. PATENT DOCUMENTS

| | | | |
|---|---|---|---|
| 4,462,633 | 7/1984 | Waeda | 296/188 |
| 5,352,011 | 10/1994 | Kihara et al. | 296/209 X |
| 5,354,115 | 10/1994 | Esaki | 296/188 X |
| 5,372,400 | 12/1994 | Enning et al. | 296/209 X |
| 5,577,797 | 11/1996 | Takanishi | 296/209 X |
| 5,613,727 | 3/1997 | Yamazaki | 296/188 |

*Primary Examiner*—Joseph D. Pape
*Attorney, Agent, or Firm*—Antonelli, Terry, Stout & Kraus, LLP.

[57] ABSTRACT

A body stopper for a vehicle includes stopper members secured to frame members of the vehicle, and gussets secured to a floor panel at the bottom of the vehicle cabin. Each gusset has its upper surface secured to the floor panel at a position corresponding to a seat cross member and its side surface secured to a side sill under a door of the body. Each gusset is formed to provide a closed cross section in cooperation with the floor panel. Stopper members are welded to the frame members at positions in front of the gussets, and each stopper member is formed to provide a closed cross section in cooperation with the associated frame member. A rearward impact to the front face of the vehicle is quickly transmitted from the frame members to the body due to reliable engagement between the gussets and the stopper members. The gussets used as elements of the body stopper also increase the rigidity of the body.

1 Claim, 4 Drawing Sheets

BODY STOPPER STRUCTURE OF A CAR

BACKGROUND OF THE INVENTION

1. Field of the Invention

This invention relates to a body stopper structure for a vehicle for quickly transmitting an impact from the vehicle frame members to the body of the vehicle when the vehicle hits an object with its front face.

2. Description of the Related Art

For a vehicle having a body mounted on frame members to define a cabin, there is known a technique for quickly transmitting an impact from the frame members to the body upon hitting an object with the front face of the vehicle to ensure early constraint of passengers (for example, by early action of an air bag) and to decrease the relative displacement between the frame and the body for the purpose of protecting the interior of the cabin from the shock. The prior technique utilizes engagement between stoppers attached to the frame members (frame-side stopper brackets) and stoppers attached to the body or cabin (cabin-side stopper brackets) (see, for example, Japanese Patent Laid-Open No. 5-185952 (1993)).

In a side view of one frame member taken from one side of the vehicle, a front portion of the frame member, in which a front wheel is installed, is bent upwardly and higher than the central part of the frame, in which cabin doors and a center pillar are located. This configuration of the frame member is necessary for installing wheels, and the bent portions are called frame kick-up portions.

When the frame members are subjected to rearward impact at the front portions, the frame members yield to the impact and absorb the impact, resulting in great deformation at the kick-up portions.

The cabin stoppers of the aforementioned Laid-Open publication are mounted to kick-up portions of frame members. Therefore, large deformation in the kick-up portions causes disengagement between frame-side stoppers and body-side stopper and often causes an increase in relative displacement between the frame members, and the body and may increase deformation of the cabin.

SUMMARY OF THE INVENTION

It is therefore an object of the invention to provide a body stopper structure for a vehicle, which can assure reliable transmission of an impact applied to the front face of the vehicle from frame members, to the body.

According to the invention, there is provided a body stopper structure for a vehicle including a pair of frame members extending in the lengthwise direction of the vehicle, a body supported on the frame members, a floor panel forming the floor of the body, a seat cross member provided on the floor panel under front seats in the cabin, and side sills extending from both sides of the floor panel, said body stopper structure comprising:

gussets, each secured both to a lower surface of the floor panel and to one of the side sills at a position corresponding to the seat cross member on the floor panel, and configured to have a closed cross section in cooperation with the floor panel; and stopper members each secured to one of the frame members at a distance from the front end of an associated gusset, and configured to have a closed cross section in cooperation with the associated frame member.

Therefore, when the vehicle hits an object with its front face, the stopper members fixed at substantially non-deformable portions of the frame member (near the seat cross member in the cabin other than the kick-up portions) reliably engage with the gussets under the floor panel and reliably transmit the impact from the frame member to the body.

DETAILED DESCRIPTION OF THE PREFERRED EMBODIMENTS

Below is a description on an embodiment of the invention with reference to the drawings.

Figure 1:
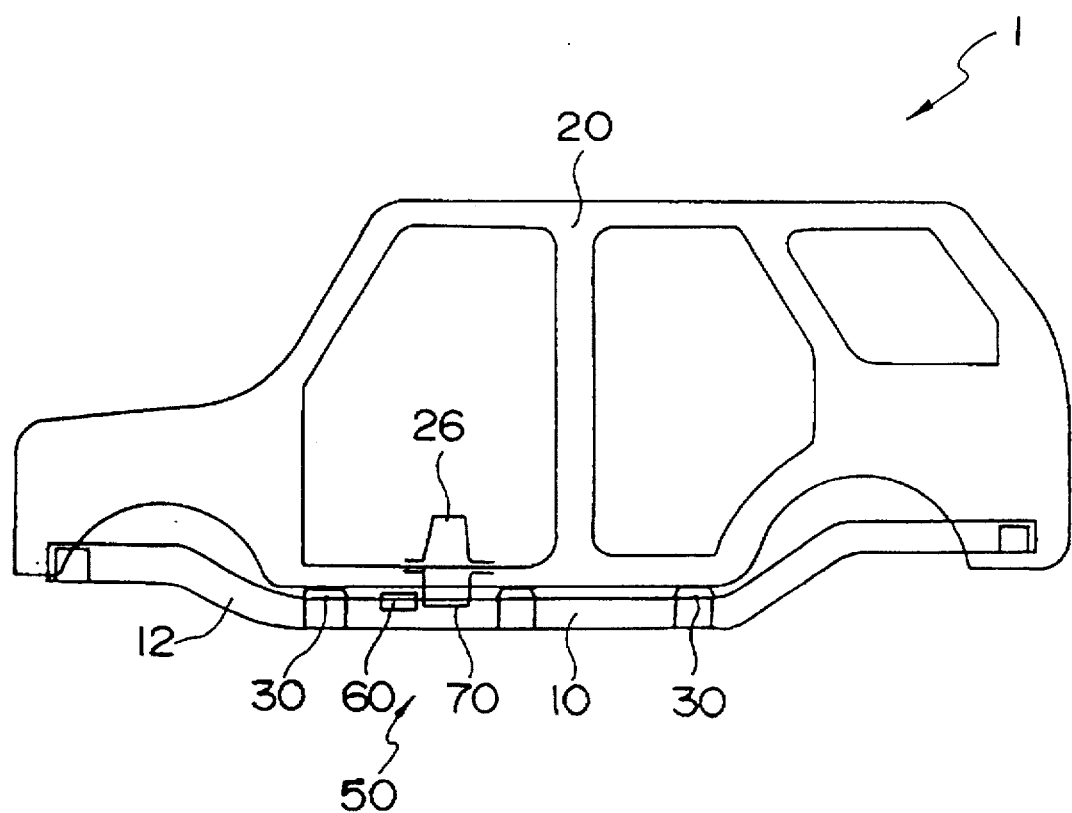
FIG. 1 is a diagrammatic side view of a frame-supported vehicle using a body stopper structure according to the invention.

In the side view of FIG. 1, a vehicle 1 has a pair of frame members 10 and a body 20 mounted on the frame members by means of body mounts 30.

Figure 2:
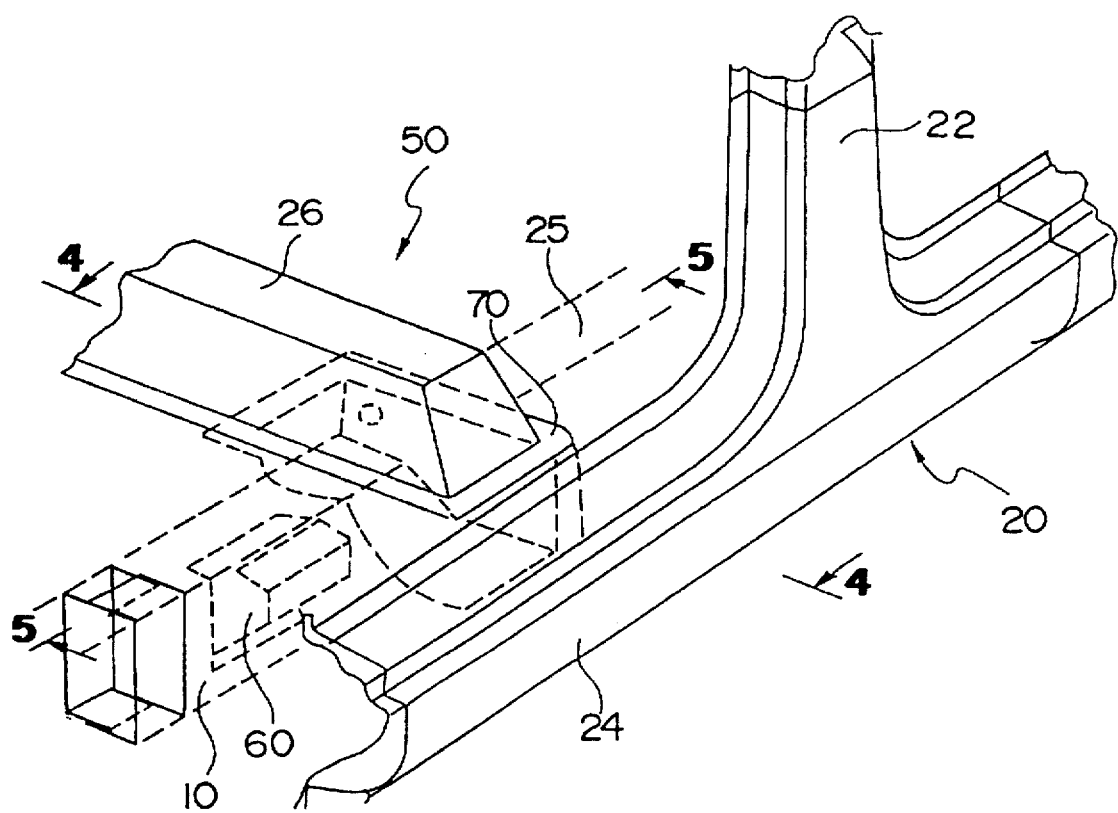
FIG. 2 is a perspective view of the body stopper structure according to the invention.
Figure 4:
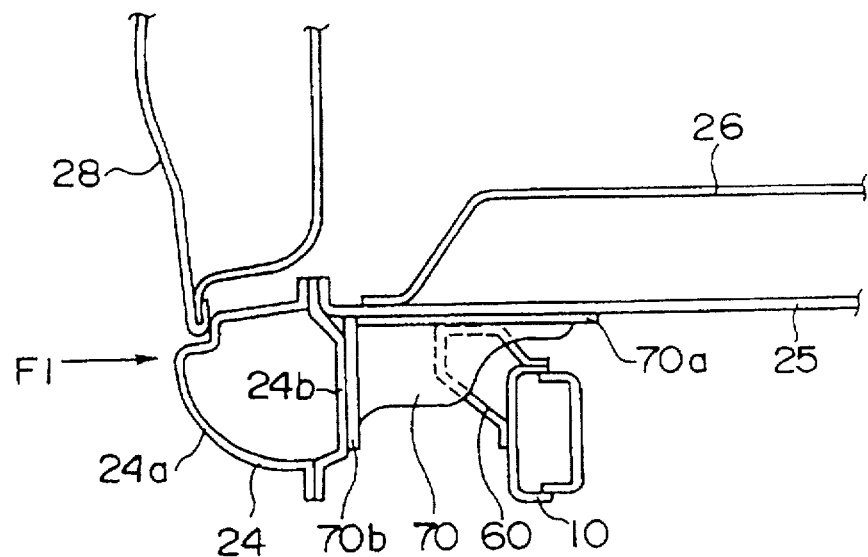
FIG. 4 is a cross-sectional view taken along the 4—4 line of FIG. 2.

As shown in FIG. 2, the floor of the body 20 of the vehicle 1 comprises a floor panel 25 and side sills 24 which are fixed to both sides of the floor panel 25 via reinforcing gussets 70 to reinforce the floor panel 25. Each side sill 24 extends continuously from a center pillar 22 and, as shown in FIG. 4, has a box-like configuration comprising an outer member 24a and an inner member 24b. The upper end of the side sill 24 is welded to the floor panel 25 (see FIG. 4).

Fixed on the upper surface of the floor panel 25 is a seat cross member 26 extending in the width direction for supporting front seats (not shown).

The vehicle 1 shown above has a body stopper structure embodying the invention as described below.

The body stopper structure 50 comprises the gussets 70, fixed to the lower surface of the floor panel 25, and a pair of stopper members 60, each secured stopper member to the outer side surface of an associated member each frame 10.

Figure 3:
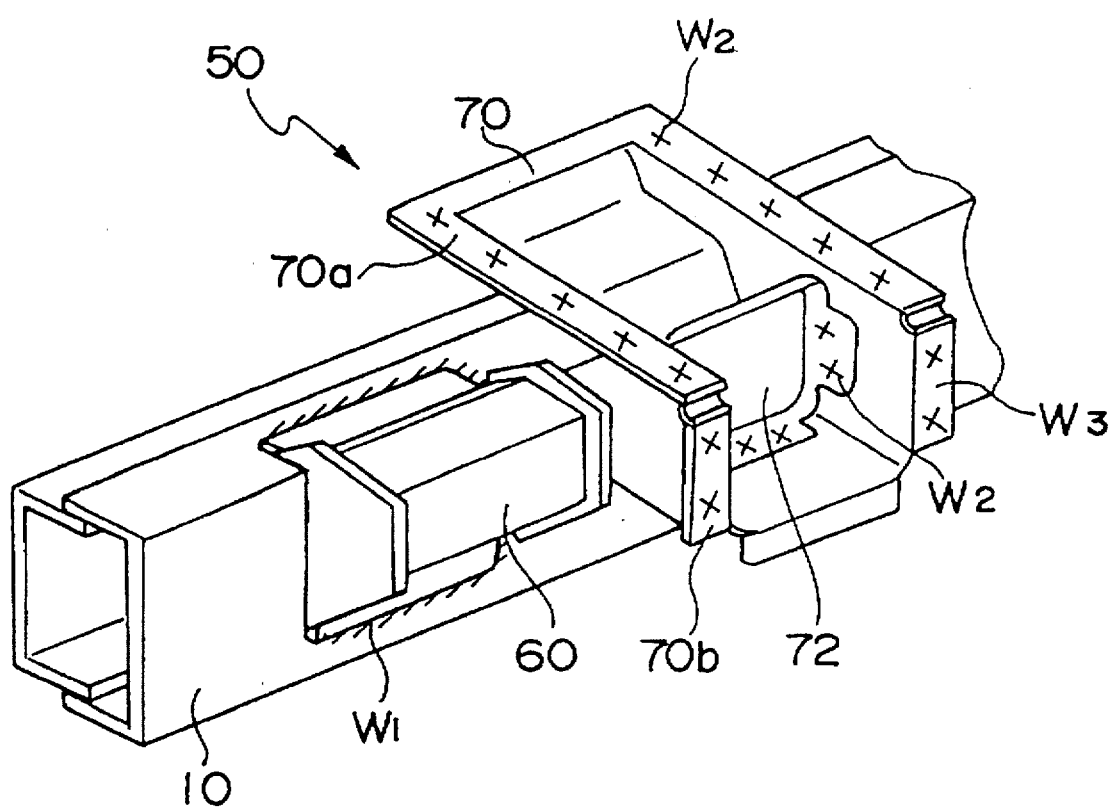
FIG. 3 is a perspective view of the body stopper structure according to the invention.

Although the gussets 70 have been used conventionally to reinforce the floor panel 25, of a vehicle the present invention uses them as a component of the body stopper structure 50. For this purpose, the gusset 70 are configured to form a closed cross section when fixed to the floor panel 25 such that a greater rigidity is obtained. As shown in FIGS. 2–4, gusset 70 is located under the floor panel 25 at a position corresponding to the seat cross member 26, with the upper surface 70a of the gusset 70 secured to the lower surface of the floor panel 25 by spot welding at spot, $W_2$ and with the side surface 70b of the gusset 70 secured to the inner member 24b of the side seal 24 by spot welding at spots $W_3$.

The stopper member 60 has a box-like configuration as shown in FIGS. 2 through 5, and it is secured to the outer side surface of the frame 10 by $CO_2$ welding at a location in front of and remote from the gusset 70 by a distance $D_1$. The stopper member 60 also forms a closed cross section when fixed to the frame 10.

Numeral 28 (FIG. 4) denotes a door at one side of the body 20.

The body stopper structure 50 having the above construction functions as explained below.

Figure 5:
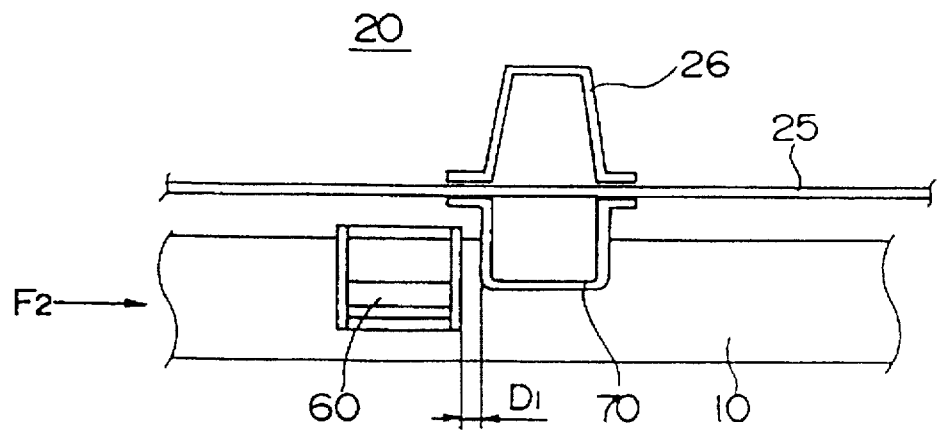
FIG. 5 is a cross-sectional view taken along the 5—5 line of FIG. 2.

When the vehicle 1 hits an object with its front face, a rearward impact $F_2$ is applied to the frame members 10 as shown in FIG. 5, and decelerates the frame members 10. However, the body 20 continues forward due to its inertial force. As a result, the gusset 70 moves into contact with the stopper 60 and transfers the impact from the frame members 10 to the body 20 quickly and reliably.

The reliable engagement between each frame member 10 and the body 20 is ensured because the stopper 60 on the frame member 10 is located in the straight-extended portion between front and rear kick-up portions 12 (more precisely, near the seat cross member 26).

The body stopper structure 50 shown above can cope with a lateral impact to the vehicle as well. That is, when a lateral impact $F_1$ is applied to one side of the vehicle as shown in FIG. 4, since the integral structure of the side sills 24 and the floor panel 25 is reinforced by the gusset 70, and since the impact $F_1$ is resisted by engagement between the gusset 70 and the frame 10, depression of and serious damage to the cabin of the vehicle 1 by the impact $F_1$ can be minimized.

The body stopper structure 50 shown above has a further advantage given by the gussets 70 fixed under the seat cross member 26. That is, the gussets 70 increase the rigidity of the seat cross member 26 supporting the front seats and increase the rigidity of the entire floor panel 25.

As described above, according to the invention, the location of the body stopper structure near the seat cross member assures quick, reliable transmission of an impact from the frame members to the body when the impact is applied to the front face of a vehicle. Moreover, the particular configuration of the gusset of the body stopper structure increases the rigidity of the seat cross member supporting the seats and the rigidity of the floor panel and the entire body, and therefore minimizes depression of the vehicle due to collision from the lateral direction so as to protect the cabin from serious damage.

What is claimed is:

1. A body stopper structure for a vehicle including a pair of frame members extending in the lengthwise direction of the vehicle, a body supported on the frame members, a floor panel forming a floor of the body, a seat cross member provided on the floor panel and adapted to be positioned under front seats in a cabin of the vehicle, and side sills extending along both sides of the floor panel, said body stopper structure comprising:

a plurality of gussets, each gusset secured both to a lower surface of the floor panel and to one of the side sills at a position corresponding to the seat cross member on the floor panel, and each gusset configured to have a closed cross section in cooperation with the floor panel; and a plurality of stopper members each stopper member secured to one of the frame members at a distance from the front end of one of the gussets, and each stopper member configured to have a closed cross section in cooperation with the associated frame member.

* * * * *